US009032921B2

(12) United States Patent
Hayman

(10) Patent No.: US 9,032,921 B2
(45) Date of Patent: May 19, 2015

(54) ENGINE ASSEMBLY INCLUDING VARIABLE VALVE LIFT ARRANGEMENT

(75) Inventor: Alan W. Hayman, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 534 days.

(21) Appl. No.: 12/961,803

(22) Filed: Dec. 7, 2010

(65) Prior Publication Data

US 2012/0137997 A1 Jun. 7, 2012

(51) Int. Cl.
| F01L 1/34 | (2006.01) |
| F01L 13/00 | (2006.01) |
| F01L 1/18 | (2006.01) |
| F02D 13/02 | (2006.01) |
| F01L 1/053 | (2006.01) |

(52) U.S. Cl.
CPC ............ F01L 13/0036 (2013.01); F01L 1/185 (2013.01); *F01L 2001/0537* (2013.01); *F01L 2001/186* (2013.01); F02D 13/0207 (2013.01); F02D 13/0257 (2013.01); *Y02T 10/18* (2013.01)

(58) Field of Classification Search
CPC .. F02D 13/0207; F02D 13/0257; F01L 1/185; F01L 13/0036; F01L 2001/186; F01L 2001/0537; Y02T 10/18
USPC .......... 123/90.39, 90.41, 90.44, 90.48, 90.52, 123/90.15, 90.22, 432, 58.8, 90.16, 184.44, 123/568.11, 568.13, 346, 58.3
See application file for complete search history.

(56) References Cited

U.S. PATENT DOCUMENTS

| 3,924,576 | A | 12/1975 | Siewert | |
| 4,506,633 | A | 3/1985 | Britsch | |
| 5,217,229 | A | 6/1993 | Jaime | |
| 6,286,467 | B1 | 9/2001 | Ancheta | |
| 6,505,592 | B1 | 1/2003 | Hayman et al. | |
| 6,668,779 | B2 * | 12/2003 | Hendriksma et al. | ...... 123/90.44 |
| 6,810,844 | B2 * | 11/2004 | Sellnau | ...................... 123/90.16 |
| 6,886,533 | B2 * | 5/2005 | Leiby et al. | ................... 123/432 |
| 7,028,648 | B2 | 4/2006 | Hasegawa et al. | |

(Continued)

FOREIGN PATENT DOCUMENTS

| CA | 2339315 A1 * | 8/2002 | ............. F02B 75/22 |
| DE | 3007746 A1 | 9/1981 | |

(Continued)

OTHER PUBLICATIONS

Hundleby, G.E., "Development of a Poppet-Valved Two-Stroke Engine—The Flagship Concept", Ricardo Consulting Engineers Ltd., SAE International Paper No. 900802, Feb. 1, 1990, 6 pgs.

*Primary Examiner* — Kenneth Bomberg
*Assistant Examiner* — Jason T Newton
(74) *Attorney, Agent, or Firm* — Harness, Dickey & Pierce, P.L.C.

(57) ABSTRACT

An engine assembly may include an engine structure defining a first combustion chamber, a first port in communication with the first combustion chamber and a second port in communication with the first combustion chamber. A first valve may be located in the first port and a second valve may be located in the second port. A first multi-step valve lift mechanism may be supported on the engine structure and engaged with the first valve. A second multi-step valve lift mechanism may be supported on the engine structure and engaged with the second valve. The first and second multi-step valve lift mechanisms may be switched between low and high lift modes independent from one another.

8 Claims, 5 Drawing Sheets

(56) References Cited

U.S. PATENT DOCUMENTS

| | | |
|---|---|---|
| 7,036,465 B2 * | 5/2006 | Burk et al. .................. 123/21 |
| 7,404,386 B1 * | 7/2008 | Raghavan et al. ......... 123/90.39 |
| 7,721,541 B2 | 5/2010 | Roberts, Jr. et al. |
| 7,740,003 B2 * | 6/2010 | Rayl ........................... 123/345 |
| 8,132,546 B2 | 3/2012 | Surnilla |
| 8,312,849 B2 * | 11/2012 | Roe et al. .................. 123/90.16 |
| 8,671,920 B2 * | 3/2014 | Hayman et al. ......... 123/568.11 |
| 2002/0043254 A1 * | 4/2002 | Iizuka et al. ............. 123/568.13 |
| 2004/0123820 A1 * | 7/2004 | Hasegawa et al. .......... 123/58.8 |
| 2006/0112940 A1 | 6/2006 | Roberts et al. |
| 2008/0017144 A1 * | 1/2008 | Litorell et al. ............. 123/90.15 |
| 2008/0201059 A1 | 8/2008 | Bryant |
| 2009/0145410 A1 * | 6/2009 | Dirker et al. ............. 123/568.13 |
| 2009/0308070 A1 | 12/2009 | Alger, II et al. |
| 2012/0042649 A1 | 2/2012 | Kaneko et al. |
| 2012/0048244 A1 | 3/2012 | Hayman et al. |

FOREIGN PATENT DOCUMENTS

| | | |
|---|---|---|
| DE | 69301470 T2 | 10/1996 |
| EP | 1167715 A2 | 1/2002 |
| WO | 2008031939 A2 | 3/2008 |

* cited by examiner

ENGINE ASSEMBLY INCLUDING VARIABLE VALVE LIFT ARRANGEMENT

FIELD

The present disclosure relates to engine assemblies including variable valve lift arrangements.

BACKGROUND

This section provides background information related to the present disclosure which is not necessarily prior art.

Internal combustion engines may combust a mixture of air and fuel in cylinders and thereby produce drive torque. Combustion of the air-fuel mixture produces exhaust gases. Valve lift mechanisms may control opening and closing of intake and exhaust ports to control air flow to the combustion chamber and exhaust flow from the combustion chamber.

SUMMARY

An engine assembly may include an engine structure, a first valve, a second valve, a first multi-step valve lift mechanism and a second multi-step valve lift mechanism. The engine structure may define a first combustion chamber, a first port in communication with the first combustion chamber and a second port in communication with the first combustion chamber. The first valve may be located in the first port and the second valve may be located in the second port. The first multi-step valve lift mechanism may be supported on the engine structure and engaged with the first valve. The first multi-step valve lift mechanism may be operable in a first low lift mode and a first high lift mode providing a greater displacement of the first valve than the first low lift mode. The second multi-step valve lift mechanism may be supported on the engine structure and engaged with the second valve. The second multi-step valve lift mechanism may be operable in a second low lift mode and second high lift mode providing a greater displacement of the second valve than the first low lift mode. The first multi-step valve lift mechanism may be operated in the first high lift mode while the second multi-step valve lift mechanism is operated in the second low lift mode.

In another arrangement, an engine assembly may include an engine structure, a first valve, a second valve, a first multi-step valve lift mechanism and a first fixed displacement valve lift mechanism. The engine structure may define a first combustion chamber, a second combustion chamber, a first port in communication with the first combustion chamber and a second port in communication with the second combustion chamber. The first valve may be located in the first port and the second valve may be located in the second port. The first multi-step valve lift mechanism may be supported on the engine structure and may be engaged with the first valve. The first multi-step valve lift mechanism may be operable in a first low lift mode and a first high lift mode providing greater displacement of the first valve than the first low lift mode. The first fixed displacement valve lift mechanism may be supported on the engine structure and engaged with the second valve. The first fixed displacement valve lift mechanism may be operable in a single lift mode providing a fixed displacement of the second valve.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
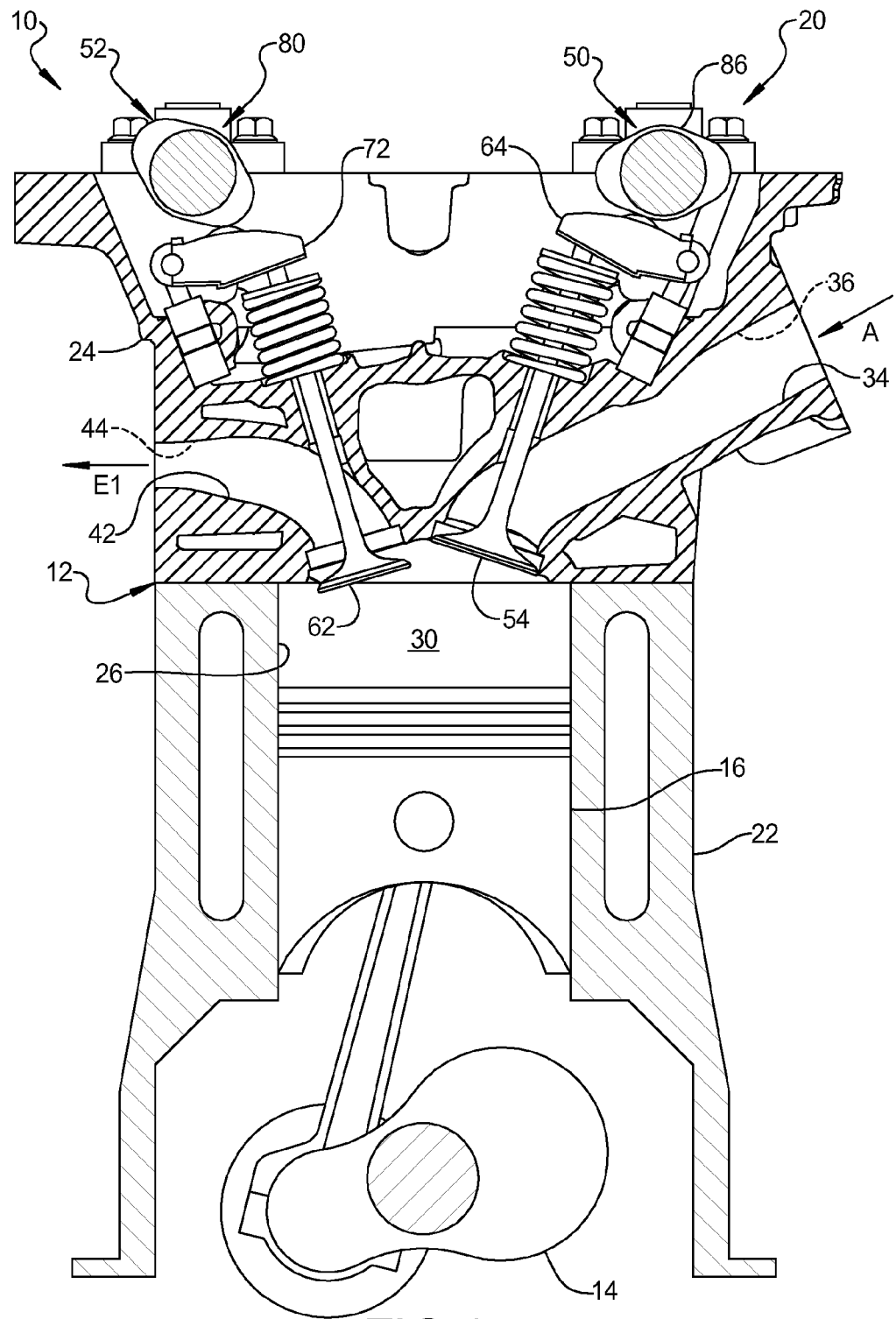
FIG. 1 is a schematic section view of an engine assembly according to the present disclosure.
Figure 2:
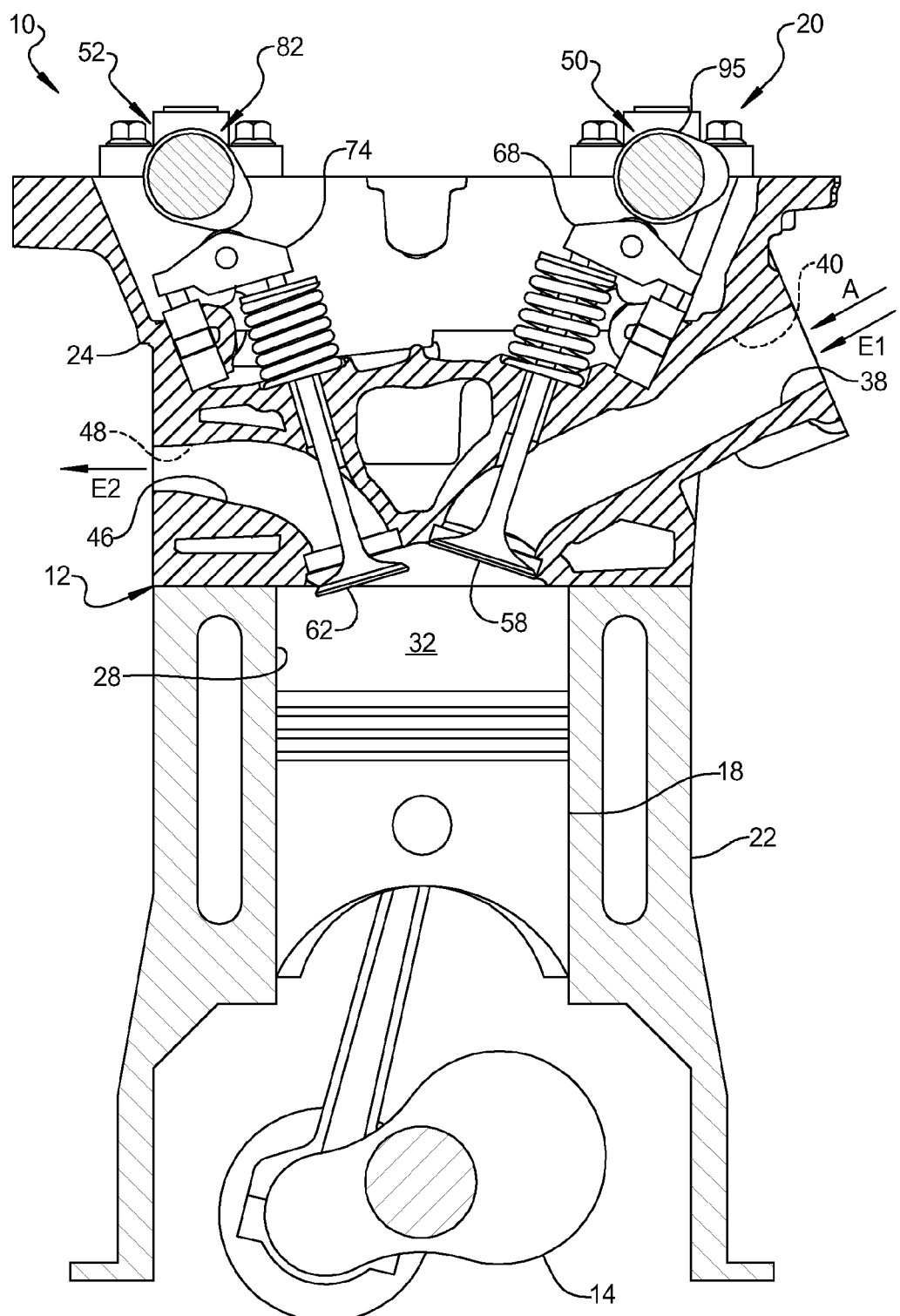
FIG. 2 is an additional schematic section view of the engine assembly of FIG. 1.
Figure 4:
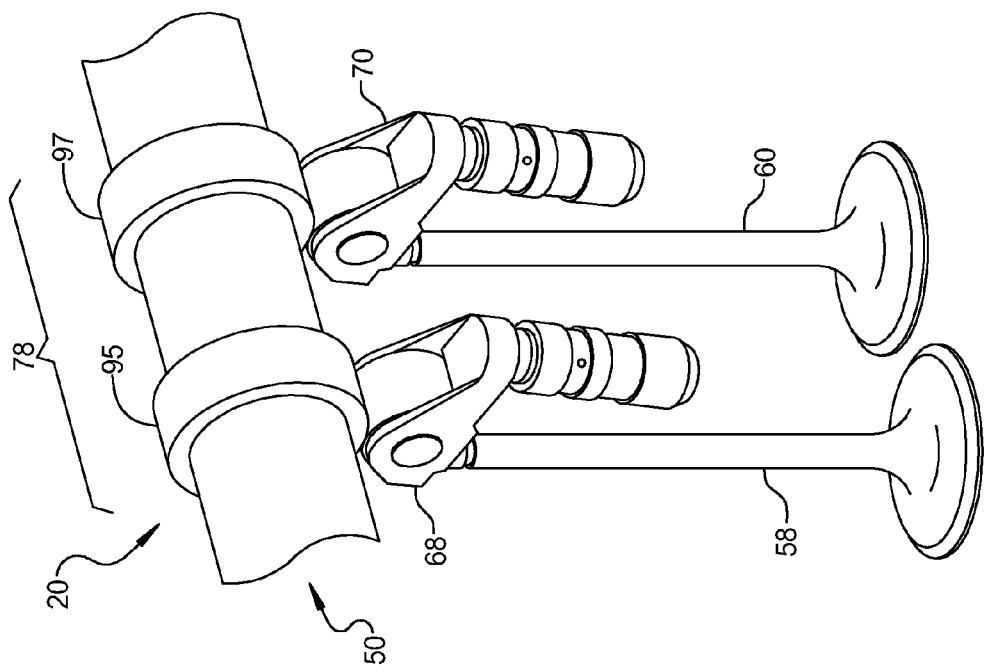
FIG. 4 is an additional fragmentary perspective view of the valvetrain assembly of FIG. 3.
Figure 3:
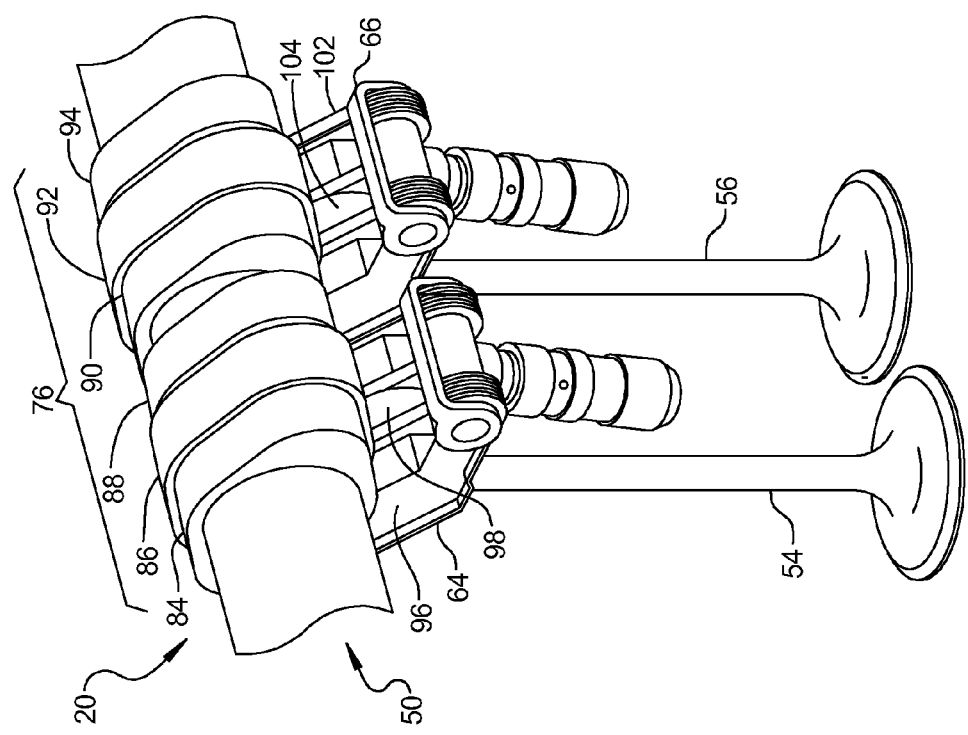
FIG. 3 is a fragmentary perspective view of the valvetrain assembly included in the engine assembly of FIG. 1.

An engine assembly 10 is illustrated in FIGS. 1 and 2 and may include an engine structure 12, a crankshaft 14, first and second pistons 16, 18, and a valvetrain assembly 20. The engine structure 12 may include an engine block 22 and a cylinder head 24. The engine structure 12 may define first and second cylinder bores 26, 28 in the engine block 22.

The first piston 16 may be located in the first cylinder bore 26 and the second piston 18 may be located in the second cylinder bore 28. The cylinder head 24 cooperates with the first cylinder bore 26 and the first piston 16 to define a first combustion chamber 30 and cooperates with the second cylinder bore 28 and the second piston 18 to define a second combustion chamber 32.

Two cylinders are described for simplicity. However, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The engine structure 12 may define a first port 34 and a second port 36 in communication with the first combustion chamber 30 and a third port 38 and a fourth port 40 in communication with the second combustion chamber 32. The first, second, third and fourth ports 34, 36, 38, 40 may form intake ports. The first and second ports 34, 36 provide air flow (A) to the first combustion chamber 30 and the third and fourth ports 38, 40 provide air flow (A) to the second combustion chamber 32.

The engine structure 12 may additionally define a first exhaust port 42 and a second exhaust port 44 in communication with the first combustion chamber that direct exhaust gas (E1) from the first combustion chamber 30. In the present non-limiting example, the first and second exhaust ports 42, 44 may also be in communication with the second combustion chamber 32, providing exhaust gas (E1) from the first combustion chamber 30 to the second combustion chamber 32 for a subsequent combustion event. The engine structure 12 may additionally define a first exhaust port 46 and a second exhaust port 48 that direct exhaust gas (E2) from the second combustion chamber 32.

The first combustion chamber 30 may form a two-stroke operating cycle combustion chamber having one combustion event for each crankshaft revolution. The second combustion chamber 32 may form a four-stroke operating cycle combustion chamber having one combustion event per two crankshaft revolutions.

The valvetrain assembly 20 may include a first camshaft 50, a second camshaft 52, a first valve 54 located in the first port 34, a second valve 56 located in the second port 36, a third valve 58 located in the third port 38 and a fourth valve 60 located in the fourth port 40. The first, second, third and fourth valves 54, 56, 58, 60 may form intake valves. The valvetrain assembly 20 may additionally include exhaust valves 62 located in the first exhaust ports 42, 46 and the second exhaust ports 44, 48.

The valvetrain assembly 20 may include first and second multi-step valve lift mechanisms 64, 66 and first and second fixed displacement valve lift mechanisms 68, 70. The first multi-step valve lift mechanism 66 may be supported on the engine structure 12 and engaged with the first valve 54 and the second multi-step valve lift mechanism 66 may be supported on the engine structure 12 and engaged with the second valve 56. The first fixed displacement valve lift mechanism 68 may be supported on the engine structure 12 and engaged with the third valve 58 and the second fixed displacement valve lift mechanism 70 may be supported on the engine structure 12 and engaged with the fourth valve 60. The first and second fixed displacement valve lift mechanisms 68, 70 may be operable in a single lift mode providing a fixed displacement of the third and fourth valves 58, 60. The first and second multi-step valve lift mechanisms 64, 66 and the first and second fixed displacement valve lift mechanisms 68, 70 may form intake valve lift mechanisms.

The valvetrain assembly 20 may additionally include multi-step valve lift mechanisms 72 and fixed displacement valve lift mechanisms 74 supported on the engine structure 12 and engaged with the exhaust valves 62. While the first combustion chamber 30 is illustrated as having multi-step valve lift mechanisms 72 associated therewith for opening and closing exhaust valves 62, it is understood that fixed displacement valve lift mechanisms could alternatively be used.

The first camshaft 50 may form an intake camshaft and may include a first set of intake lobes 76 and a second set of intake lobes 78. The first set of intake lobes 76 and the second set of intake lobes 78 may be fixed for rotation with one another on the first camshaft 50. In one non-limiting example, the first camshaft 50 may be fixed for rotation with the crankshaft 14 (i.e., no cam phaser). In another non-limiting example, the first camshaft 50 may be rotatable relative to the crankshaft 14 via a cam phaser. In a further non-limiting example, the first set of intake lobes 76 and the second set of intake lobes 78 may be rotatable relative to one another and relative to the crankshaft 14 via a cam phaser. The second camshaft 52 may form an exhaust camshaft and may include a first set of exhaust lobes 80 and a second set of exhaust lobes 82. The first set of exhaust lobes 80 and the second set of exhaust lobes 82 may be fixed for rotation with one another on the second camshaft 52. In one non-limiting example, the second camshaft 52 may be fixed for rotation with the crankshaft 14 (i.e., no cam phaser). In another non-limiting example, the second camshaft 52 may be rotatable relative to the crankshaft 14 via a cam phaser. In a further non-limiting example, the first set of exhaust lobes 80 and the second set of exhaust lobes 82 may be rotatable relative to one another and relative to the crankshaft 14 via a cam phaser.

The first set of intake lobes 78 may include a first lobe 84, a second lobe 86 and a third lobe 88 engaged with the first multi-step valve lift mechanism 64 and a first lobe 90, a second lobe 92 and a third lobe 94 engaged with the second multi-step valve lift mechanism 66. The first, second and third lobes 84, 86, 88 and the first, second and third lobes 90, 92, 94 may each form a double lobe including first and second peaks to accommodate the two-stroke operating cycle of the first combustion chamber 30. Similarly, the exhaust lobes from the first set of exhaust lobes 80 may each form a double lobe including first and second peaks to accommodate the two-stroke operating cycle of the first combustion chamber 30. The cam lobes 95, 97 included in the second set of intake lobes 78 and the second set of exhaust lobes 82 may each form a single lobe including a single peak.

In the present non-limiting example, the first and second camshafts 50, 52 may rotate at one-half of the rotational speed of the crankshaft 14. Therefore, the first and second valves 54, 56 (intake valves) and exhaust valves 62 associated with the first combustion chamber 30 may each be opened once per crankshaft revolution. The third and fourth valves 58, 60 (intake valves) and the exhaust valves 62 may each be opened once per two crankshaft revolutions to accommodate the multi-cycle arrangement (two-stroke and four-stroke operating cycles).

With reference to FIGS. 3-8, the first and second multi-step valve lift mechanisms 64, 66 may vary the amount of air introduced to the first combustion chamber 30 to control the exhaust gas (E1) provided to the second combustion chamber 32. The first multi-step valve lift mechanism 64 may form a rocker arm including first and second members 96, 98 and a first locking mechanism 100. The first and third lobes 84, 88 may be engaged with the first member 96 and the second lobe 86 may be engaged with the second member 98. The second multi-step valve lift mechanism 66 may form a rocker arm including first and second members 102, 104 and a second locking mechanism 106. The first and third lobes 90, 94 may be engaged with the first member 102 and the second lobe 92 may be engaged with the second member 104.

The first multi-step valve lift mechanism 64 may be operable in a first low lift mode and a first high lift mode providing a greater displacement of the first valve 54 than the first low lift mode. The second multi-step valve lift mechanism 66 may be operable in a second low lift mode and a second high lift mode providing a greater displacement of the second valve than the first low lift mode. By way of non-limiting example, the first locking mechanism 100 may secure the first and second members 96, 98 for displacement with one another during the first high lift mode and may allow relative displacement between the first and second members 96, 98 during the first low lift mode. Similarly, the second locking mechanism 106 may secure the first and second members 102, 104 for displacement with one another during the second high lift mode and may allow relative displacement between the first and second members 102, 104 during the second low lift mode.

The first multi-step valve lift mechanism 64 may be in communication with a first fluid supply 108 and the second multi-step valve lift mechanism 66 may be in communication with a second fluid supply 110 independent from the first fluid supply 108. More specifically, the first locking mechanism 100 may be in communication with the first fluid supply 108 and the second locking mechanism 106 may be in communication with the second fluid supply 110. The first fluid supply 108 may include a first valve 112 in communication with a pressurized fluid 132 and the second fluid supply 110 may include a second valve 114 in communication with the pressurized fluid 132.

Figure 5:
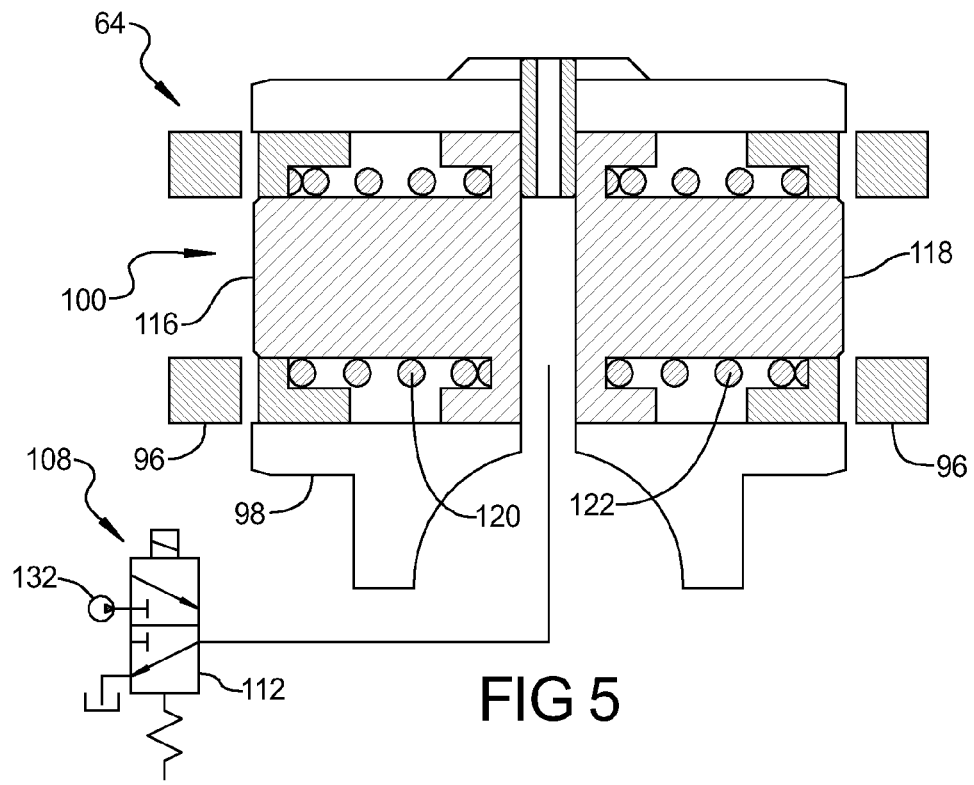
FIG. 5 is a schematic section view of a first multi-step valve lift mechanism from the valvetrain assembly shown in FIG. 3.
Figure 6:
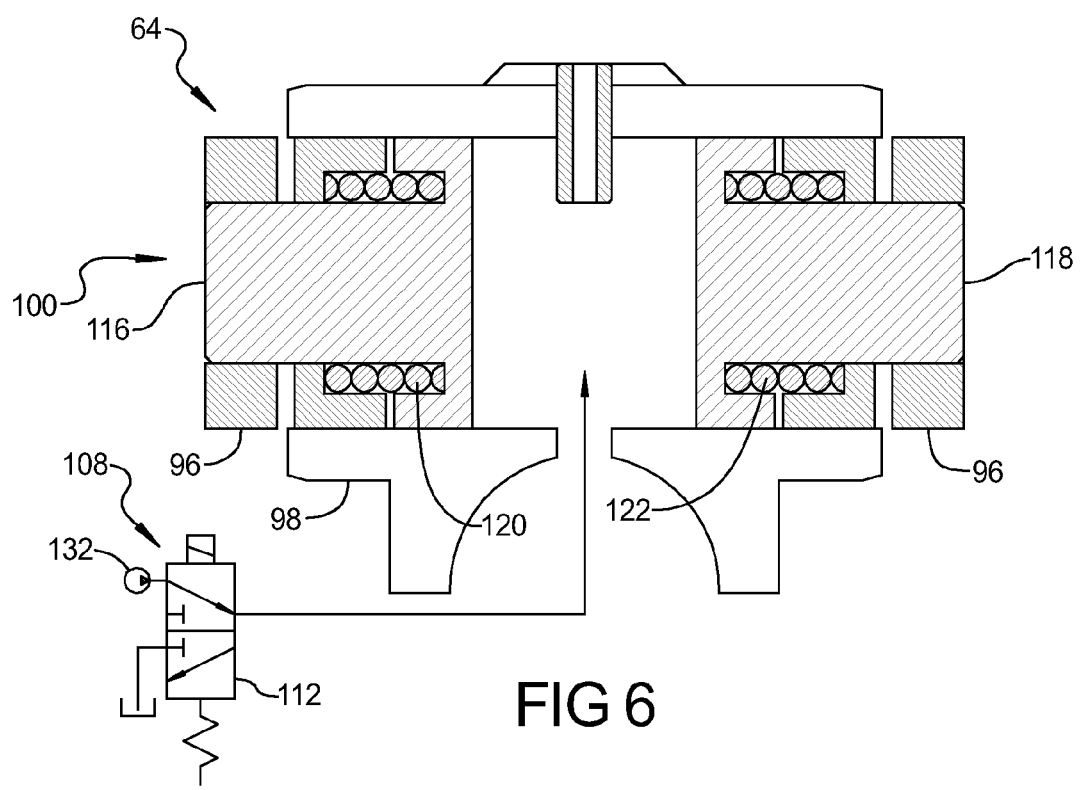
FIG. 6 is an additional schematic section view of the first multi-step valve lift mechanism shown in FIG. 5.

As seen in FIGS. 5 and 6, the first locking mechanism 100 may include first and second lock pins 116, 118 and first and second biasing members 120, 122 housed within the second member 98. The first locking mechanism 100 may be displaceable between a first unlocked position (FIG. 5) and a first locked position (FIG. 6). The first valve 112 may selectively provide communication between the pressurized fluid 132 and the first multi-step valve lift mechanism 64 to switch between the first high lift mode and the first low lift mode.

In the first unlocked position, the first and second biasing members 120, 122 may force the first and second lock pins 116, 118 inward toward one another and out of engagement with the first member 96, allowing relative displacement between the first and second members 96, 98 during the first low lift mode (FIG. 5). When operation in the first high lift mode (FIG. 6) is desired, the first valve 112 may provide communication between the pressurized fluid 132 and the first multi-step valve lift mechanism 64 to displace the first locking mechanism 100 to the first locked position. The pressurized fluid 132 may displace the first and second lock pins 116, 118 outward from one another against the force applied by the first and second biasing members 120, 122 and into engagement with the first member 96.

Figure 7:
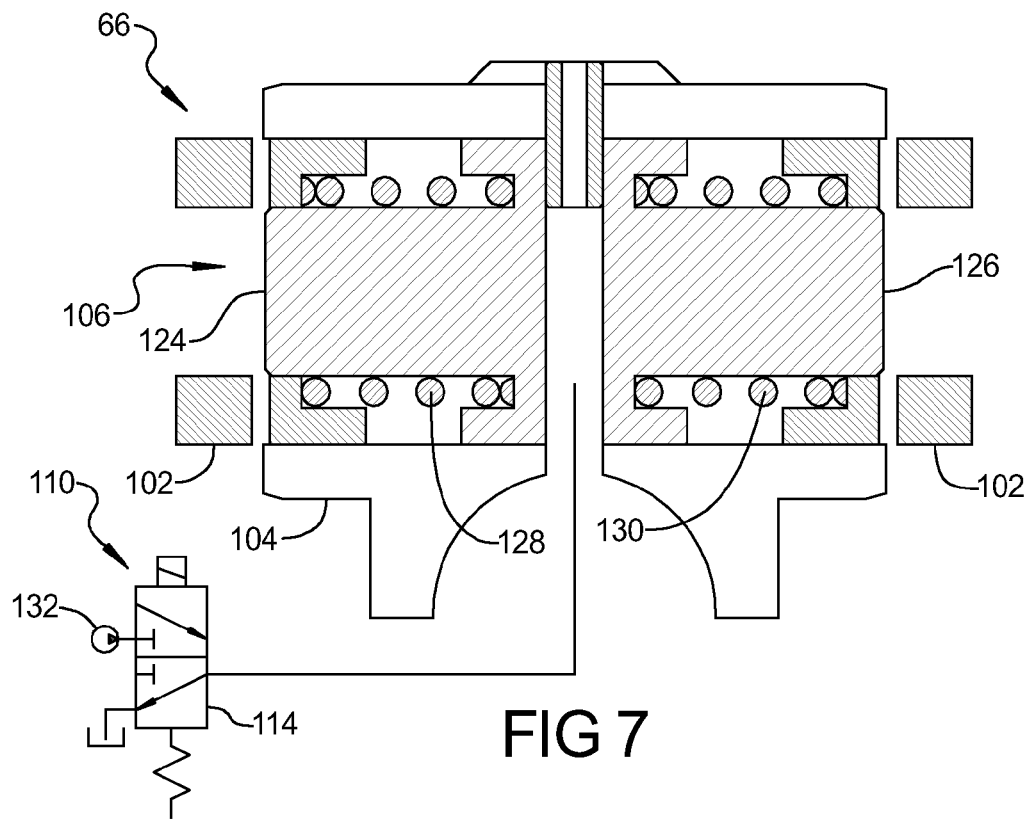
FIG. 7 is a schematic section view of a second multi-step valve lift mechanism from the valvetrain assembly shown in FIG. 3.
Figure 8:
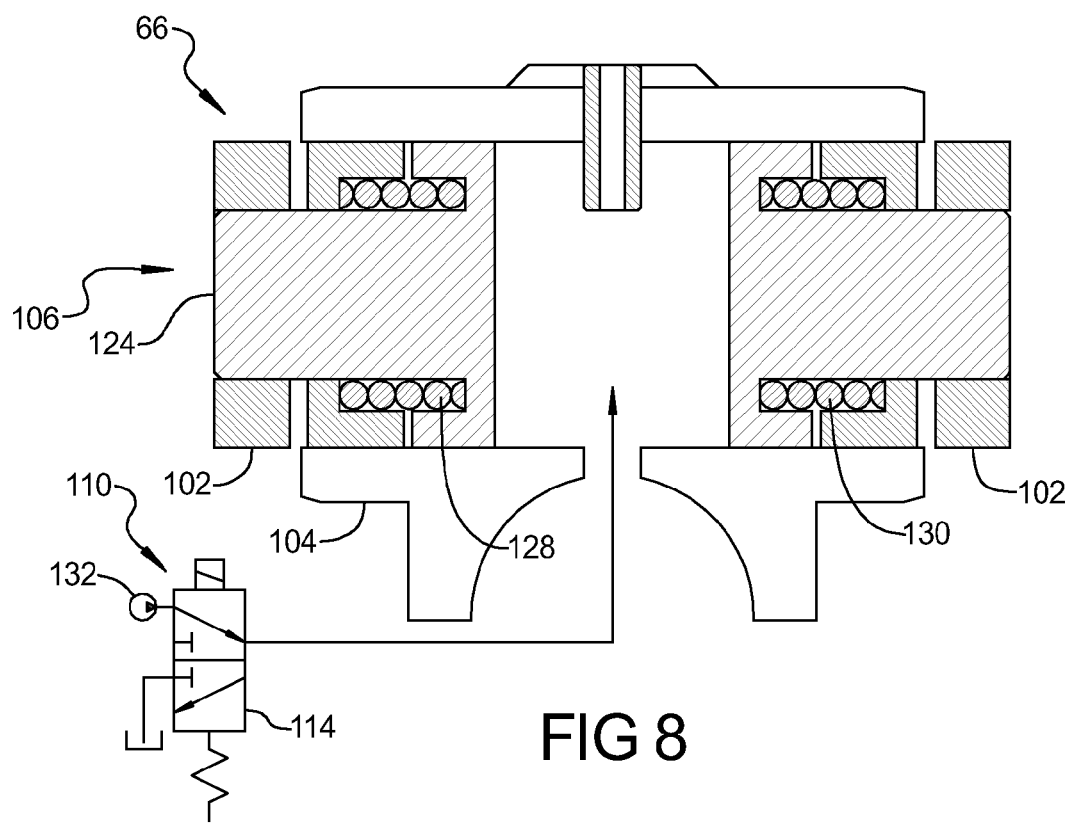
FIG. 8 is an additional schematic section view of the second multi-step valve lift mechanism shown in FIG. 7.

Similarly, and as seen in FIGS. 7 and 8, the second locking mechanism 106 may include first and second lock pins 124, 126 and first and second biasing members 128, 130 housed within the second member 104. The second locking mechanism 106 may be displaceable between a second unlocked position (FIG. 7) and a second locked position (FIG. 8). The second valve 114 may selectively provide communication between the pressurized fluid 132 and the second multi-step valve lift mechanism 66 to switch between the second high lift mode and the second low lift mode.

In the second unlocked position, the first and second biasing members 128, 130 may force the first and second lock pins 124, 126 inward toward one another and out of engagement with the first member 102, allowing relative displacement between the first and second members 102, 104 during the second low lift mode (FIG. 7). When operation in the second high lift mode (FIG. 8) is desired, the second valve 114 may provide communication between the pressurized fluid 132 and the second multi-step valve lift mechanism 66 to displace the second locking mechanism 106 to the second locked position. The pressurized fluid 132 may displace the first and second lock pins 124, 126 outward from one another against the force applied by the first and second biasing members 128, 130 and into engagement with the first member 102.

The first multi-step valve lift mechanism 64 provides a first valve lift for the first valve 54 during the first low lift mode and the second multi-step valve lift mechanism 66 provides a second valve lift for the second valve 56 during the second low lift mode. The first multi-step valve lift mechanism 64 provides a third valve lift for the first valve 54 during the first high lift mode and the second multi-step valve lift mechanism 66 provides a fourth valve lift for the second valve 56 during the second low lift mode.

The first and second multi-step valve lift mechanisms 64, 66 provide first, second and third operating modes. The first operating mode may include the first multi-step valve lift mechanism 64 operating in the first high lift mode and the second multi-step valve lift mechanism operating in the second high lift mode. The second operating mode may include the first multi-step valve lift mechanism 64 operating in the first high lift mode and the second multi-step valve lift mechanism 66 operating in the second low lift mode. The third operating mode may include the first multi-step valve lift mechanism 64 operating in the first low lift mode and the second multi-step valve lift mechanism 66 operating in the second low lift mode.

The variation in valve lift provided by the first and second multi-step valve lift mechanisms 64, 66 may control air flow provided to the first combustion chamber 30. The first operating mode may provide at least 25 percent greater air flow to the first combustion chamber 30 than the second operating mode. The third operating mode may provide at least 25 percent less air flow to the first combustion chamber 30 than the second operating mode.

In a first non-limiting example, the first valve lift may be equal to the second valve lift and the third valve lift may be equal to the fourth valve lift. By way of non-limiting example, and for purposes of illustration only, the first valve lift and the second valve lift may each include a 2.0 millimeter (mm) valve displacement and the third valve lift and the fourth valve lift may each include a 6.0 mm valve displacement.

In a second non-limiting example, the second valve lift may be greater than the first valve lift and the third valve lift may be equal to the fourth valve lift. By way of non-limiting example, and for purposes of illustration only, the first valve lift may include a 2.0 mm valve displacement, the second valve lift may include a 3.0 mm valve displacement and the third valve lift and the fourth valve lift may each include a 6.0 mm valve displacement.

In the second non-limiting example, a fourth operating mode may optionally be provided including operating the first multi-step valve lift mechanism 64 in the first low lift mode and the second multi-step valve lift mechanism 66 in the second high lift mode to further control air flow to the first combustion chamber 30. The engine assembly 10 may optionally further include a throttle mechanism in communication with and upstream of the first and second ports 34, 36 to provide additional control of air flow to the first combustion chamber 30.

What is claimed is:

1. An engine assembly comprising:
   an engine structure defining a first combustion chamber, a second combustion chamber, a first pair of intake ports in direct communication with the first combustion chamber and a second pair of intake ports in direct communication with the second combustion chamber a first exhaust port in direct communication with the first combustion chamber and in communication with the second pair of intake ports to provide exhaust gasses from the first combustion chamber to the second combustion chamber;
   a first pair of intake valves located in the first pair of intake ports;
   a second pair of intake valves located in the second pair of intake ports;
   a first pair of multi-step valve lift mechanisms supported on the engine structure and engaged with the first pair of intake valves, the first pair of multi-step valve lift mechanisms operable in a first low lift mode and a first high lift mode providing a greater displacement of the first pair of intake valves than the first low lift mode; and
   a first pair of fixed displacement valve lift mechanisms supported on the engine structure and engaged with the second pair of intake valves, the first pair of fixed displacement valve lift mechanisms operable in a single lift mode providing a fixed displacement of the second pair of intake valves.

2. The engine assembly of claim 1, wherein one of the first pair of multi-step valve lift mechanisms is operable in the first high lift mode while the other of the first pair of multi-step valve lift mechanisms is operated in the first low lift mode.

3. The engine assembly of claim 2, wherein the first pair of multi-step valve lift mechanisms each include a locking mechanism displaceable between a first locked position and a first unlocked position via independent fluid supplies to independently switch the first pair of multi-step valve lift mechanisms between the first high lift mode and the first low lift mode.

4. The engine assembly of claim 2, wherein the first pair of multi-step valve lift mechanisms provides a first valve lift for the first pair of intake valves during the first low lift mode.

5. The engine assembly of claim 2, wherein one of the pair of first multi-step valve lift mechanisms provides a first valve lift for one of the first pair of intake valves during the first low lift mode and the other of the first pair of multi-step valve lift mechanisms provides a second valve lift for the other of the first pair of intake valves during the first low lift mode greater than the first valve lift.

6. The engine assembly of claim 2, wherein the first pair of multi-step valve lift provide a first operating mode including both of the first pair of multi-step valve lift mechanisms operating in the first high lift mode, a second operating mode including one of the first pair of multi-step valve lift mechanisms operating in the first high lift mode and the other of the first pair of multi-step valve lift mechanisms operating in the first low lift mode, and a third operating mode including both of the first pair of multi-step valve lift mechanisms operating in the first low lift mode.

7. The engine assembly of claim 1, wherein the first combustion chamber defines a two-stroke operating cycle combustion chamber and the second combustion chamber defines a four-stroke operating cycle combustion chamber.

8. The engine assembly of claim 1, further comprising a first camshaft including a pair of double lobes engaged with the first pair of multi-step valve lift mechanisms and defining first and second peaks and a pair of single lobes engaged with the first pair of fixed displacement valve lift mechanisms and defining a single peak.

* * * * *